US005198275A

United States Patent [19]

Klein

[11] Patent Number: 5,198,275

[45] Date of Patent: Mar. 30, 1993

[54] CARD STOCK SHEETS WITH IMPROVED SEVERANCE MEANS

[76] Inventor: Gerald B. Klein, 13451 Stuart Ct., Broomfield, Colo. 80020

[21] Appl. No.: 745,078

[22] Filed: Aug. 15, 1991

[51] Int. Cl.[5] .......... B32B 3/10

[52] U.S. Cl. .......... 428/43; 428/136; 428/137; 206/824

[58] Field of Search .......... 428/43, 136, 137; 206/824

[56] References Cited

U.S. PATENT DOCUMENTS

| | | | |
|---|---|---|---|
| 2,321,184 | 6/1943 | Butterworth | 428/42 |
| 2,521,435 | 9/1950 | Wockenfuss | 101/227 |
| 2,805,816 | 9/1957 | Morgan | 229/92.8 |
| 3,006,793 | 10/1961 | Wheeler III | 428/43 |
| 3,034,102 | 2/1967 | Huffman | 281/5 |
| 3,035,957 | 5/1962 | Morgan | 428/43 |
| 3,508,754 | 4/1970 | Shorin | 428/42 |
| 3,547,752 | 12/1970 | Janssen | 428/43 |
| 5,007,191 | 4/1991 | Klein | 40/638 |

*Primary Examiner*—Alexander S. Thomas
*Attorney, Agent, or Firm*—Wegner, Cantor, Mueller & Player

[57] ABSTRACT

A card stock sheet prepared for subsequent severance along a perforation line in the sheet defined by a sequence of closely spaced perforations and a continuous score cut at one surface of the sheet, extending part way into the sheet and coinciding with the perforation line with the uncut portions of the sheet between the perforations maintaining sheet integrity and with the score cut line providing a smooth edge when severance occurs.

10 Claims, 3 Drawing Sheets

CARD STOCK SHEETS WITH IMPROVED SEVERANCE MEANS

This invention relates to improvements in the severability of comparatively thick paper sheets such as cord stock or the like, which is hereinafter called card stock, and more particularly to the severability of card stock by combining closely spaced perforations and score cuts.

The severability of paper and card stock by a line of closely spaced perforations is well known to the art. The primary advantage of line perforation lies in manual severability of the card stock components. For example, a sheet of card stock may be perforated for manual separation into a number of individual cards subsequent to printing. The primary disadvantage is that the separation of the cards along the lines of perforation leaves a rough undesirable edge which is objectional in some applications, for example business cards.

The severability of paper card stock by score cuts is well known to the art. The primary advantage of score cuts is a neatly appearing severed edge. The primary disadvantage of score cuts is that special equipment is required normally only available to the professional printing trades. Since the availability and use of duplicating and printing machines such as laser, ink jet, dot matrix and the like, there is a real and definite need for a means of manually separating printed card-stock sheets into neat and acceptable individual cards. Perforation lines, or micro-perforation lines are the only available means for manual separation of individual cards from card stock at the present time. These perforations leave an objectionable rough edge, as heretofore mentioned.

With the above considerations in view, the present invention was conceived to provide a manually separable sheet which substantially reduces the objectional edge roughness of business cards and the like and provides an acceptable product. The invention comprises, in essence: A card stock sheet, or the like, a severable line perforation, preferably a micro-perforation combined with a score cut coinciding with the line perforation, but with a controlled depth into the card stock sheet such that the upper edge of the card, at the score cut, will be smooth and even and sufficient material between the micro-perforations will remain at the lower edge to maintain sheet integrity until manually separated.

The objects of the invention are to provide a novel and improved method for micro-perforating and score-cutting a cardstock sheet, and a novel and improved product thereby which: (1) permits the manual separation of individual cards from a card stock sheet having comparatively smooth even edges; (2) permits separation of individual cards from a card stock sheet after the cards are printed by individuals who do not have access to professional cutting and trimming equipment; (3) which is additionally suitable for cutting cards formed of laminated stock sheets and which is simple, economical and efficient, and can be done at the time the card stock is manufactured.

With the foregoing and other objects in view, all of which more fully hereinafter appear, my invention comprises certain constructions, combinations and arrangements of parts and elements and of steps and sequences, hereinafter described, defined in the appended claims and illustrated in preferred embodiments in the accompanying drawing in which;

DETAILED DESCRIPTION OF INVENTION

Figure 1:
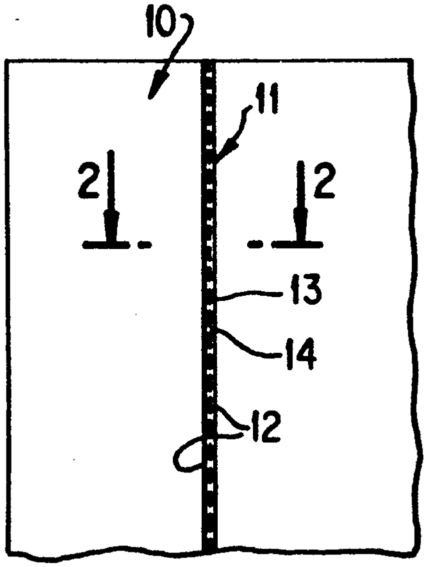
FIG. 1 is a corner portion of a card stock sheet having an improved combined perforated line, score-cut thereon, somewhat exaggerated in width to better depict its basic construction.
Figure 2:
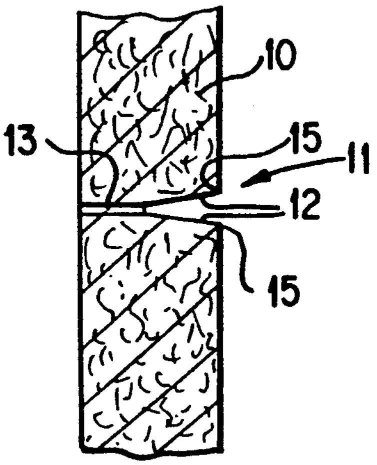
FIG. 2 is a transverse section of the card stock as taken from the indicated line 2—2 at FIG. 1, but on a greatly enlarged scale.

Referring more particularly to the drawing, FIG. 1 depicts a corner of a card-stock 10 having a severance line 11 thereon depicting the sides of a score cut 12 with a line of perforations 13 at the trough of the score cut and extending through the card stock 10. The card stock 10 may vary in thickness somewhat but is normally in the approximate range of 0.006 to 0.015 inches thick for business cards but for other purposes may be considerably thicker, even as much as ⅛ inch. The depth of the score cut may vary somewhat and is depicted as being about ½ the thickness of the card stock 10. For thick card stock, this depth may be a substantially larger portion of the thickness thereof.

The perforations 13 are preferably micro-perforations cut by a laser beam and may be round in section or elongated with rounded ends. The perforations do not touch each other but will be spaced apart slightly to form connections 14 to the card material at each side of the severance line 11. It is these connections 14 which are pulled apart whenever the severance line 11 is severed as by a simple manual operation.

The score cut dies and the laser apparatus needed to form this severance line 11 are conventional and need not be described. It is to be noted that the score cut 12 at one side of the card stock 10 will provide a smooth edge 15 at each side of the cut which enhances the appearance of the finished product. If the score cut is made first, a guide pin, not shown, may be used to follow the score cut and guide the laser beam to assure precise coincidence of the perforations with the score cut.

Several embodiments of the present invention are possible and a further description of the same will be made with reference to a preferred embodiment wherein the card stock 10 will be described as a laminated member 10*a* having a paper face card stock 140 a contact adhesive 95 and a protective backing sheet 145. This embodiment is more fully described in my prior U.S. Pat. No. 5,007,191 issued Apr. 16, 1991, that patent being directed to the construction of a business card having a removable printed panel as described below.

Figure 4:
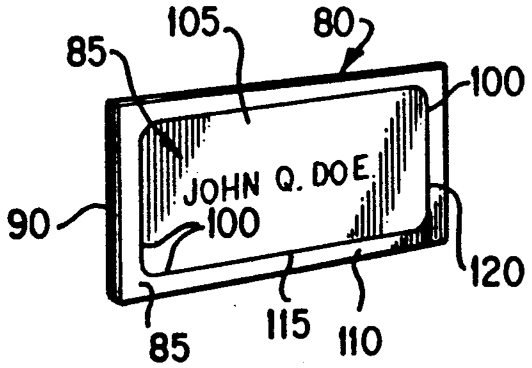
FIG. 4 is a perspective illustration of an individual business card shown on the sheet at FIG. 3.
Figure 5:
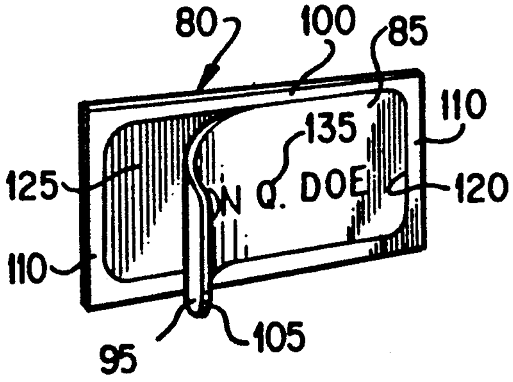
FIG. 5 is a perspective view similar to FIG. 4 but with the lift-out panel being partially removed.
Figure 6:
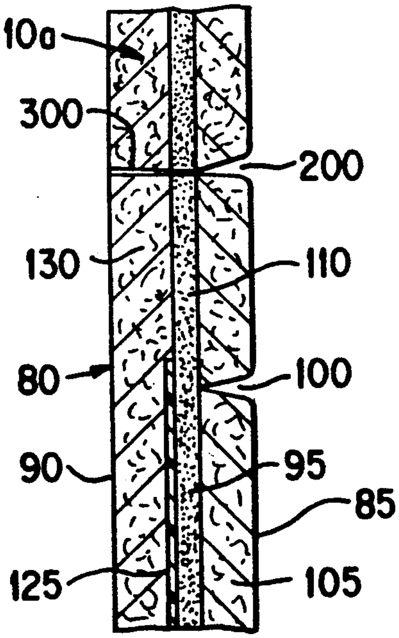
FIG. 6 is a sectional portion of the card stock sheet as taken from the indicated line 6—6 at FIG. 3 but on a greatly enlarged scale.

FIGS. 4 and 5 depict an individual card 80, or label, after its removal from the card stock sheet 10*a*. FIG. 6 depicts a sectional portion of the card stock sheet 10*a* showing a portion of the card 80. Each card or label comprises a laminate of paper or other material including an information-carrying sheet 85 and a backing sheet 90. The face and backing sheets 85 and 90 are secured together by a contact adhesive 95 as shown in FIG. 6. This adhesive may be selected from those types providing suitable resistance to heat and pressure which may be generated by printing on the face sheet 85.

A rectangular score cut 100 is cut in the face sheet 85 about the marginal edge portions to define a lift out panel 105 and a marginal edge strip 110 about the panel. The lift out panel 105 and the marginal edge strip 110 may receive information printed thereon by the user. As shown in FIG. 5, the lift out panel 105 may be removed from the card 85 after printing with the contact adhesive 95 being intact, as will be described, and thereafter affixed to any other surface as desired.

The laminated backing sheet 90 and face sheet 85 forms a card 80 which in ordinary use is still rigid enough to resist inadvertent bending, especially at the corners. However, to permit the lift out panel 105 to be lifted out, the central portion of the backing sheet 90 is treated with a release agent to provide a release surface 125, as shown in FIGS. 5, which will not adhere to the contact adhesive layer 95 of the lift-out panel 105. At the same time, the edge margins 130 of the backing sheet 90 will remain tightly bonded to the corresponding edge margins 110 of the face sheet 85.

Figure 3:
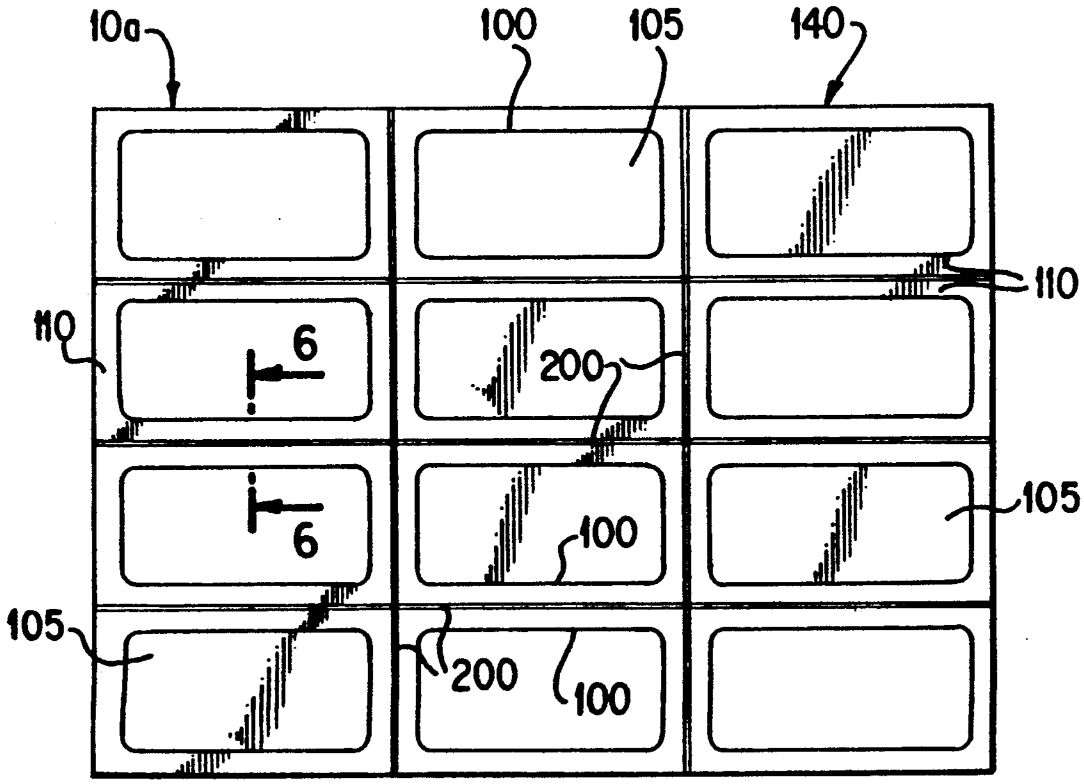
FIG. 3 shows a card stock sheet having cards formed thereon by the improved perforated lines, score cuts thereon, hereinafter called "severance lines" outlining a number of business cards on the sheet, said stock sheet depicted as being laminated with a lift-out panel in the face of each card to illustrate a specific embodiment of the invention.
Figure 7:
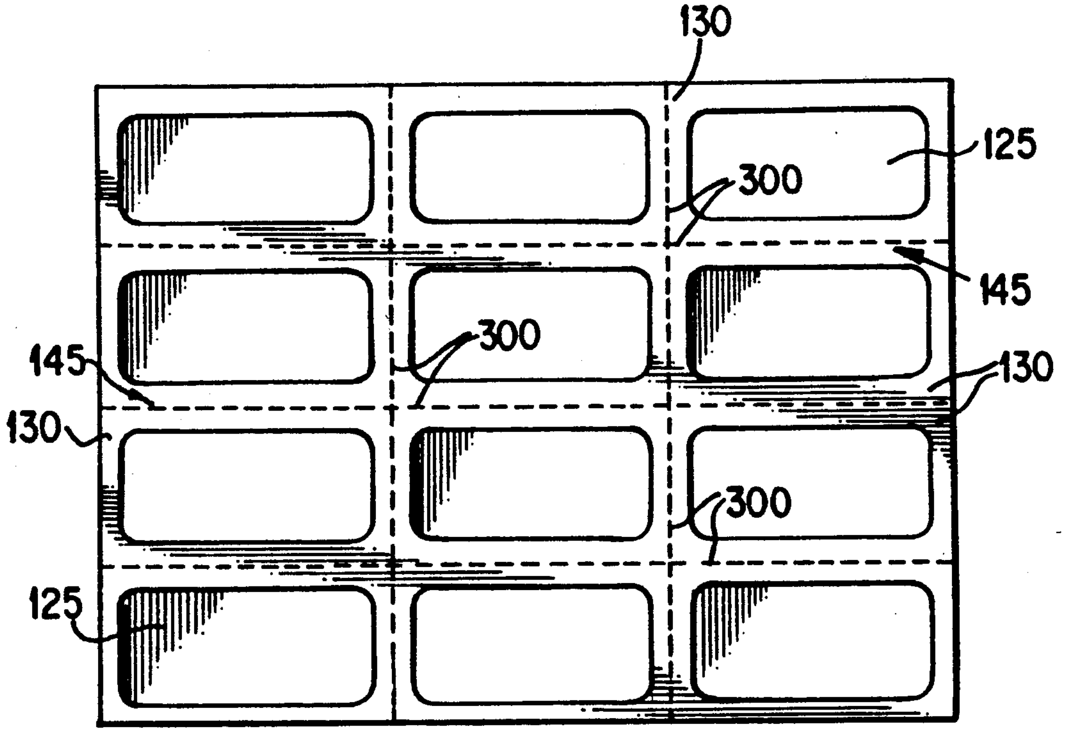
FIG. 7 shows the card stock sheet illustrated at FIG. 3, but with the laminated top sheet being removed.

As indicated in FIG. 6, each individual card 80 may be easily removed from the laminated card stock sheet 10*a* depicted in FIGS. 3, 6 and 7. Removal will be ordinarily after printing on the surface of the face sheet 85. In this respect, transverse and longitudinal score cuts 200 are placed in the card stock 10*a* to encompass the periphery of each card 80. Each score cut extends through the face sheet 85 to or into the layer of contact adhesive, and such score cuts may even extend a short distance into the backing sheet 90. Closely spaced micro perforations 300 extend through the backing sheet, substantially in alignment with the score cut 200 to coincide with the trough of the score cut. The undisturbed portion between each adjacent micro-perforation is sufficiently strong to hold each card 80 in place within the card stock 10*a* to allow the stock to be printed to impart information on the card face 85 yet the construction is weak enough to tear out and remove each card subsequent to the printing process. The micro-perforations ensure a smooth peripheral edge of each card and the smoothness of the edge at the card face 85 is enhanced by the score cut 200 without any roughness or fraying of torn paper.

Finished card or label stock as shown in FIGS. 3 and 7 include paper face card stock 140, FIG. 3, with the contact adhesive at the back side. The protective backing sheet 145 lies against the contact adhesive surface and includes the release surfaces 125. The score cuts 200 outlining the individual cards are shown at FIG. 3. The micro-perforations 300 coinciding with the score cuts 200 are shown at FIG. 7.

Figure 8:
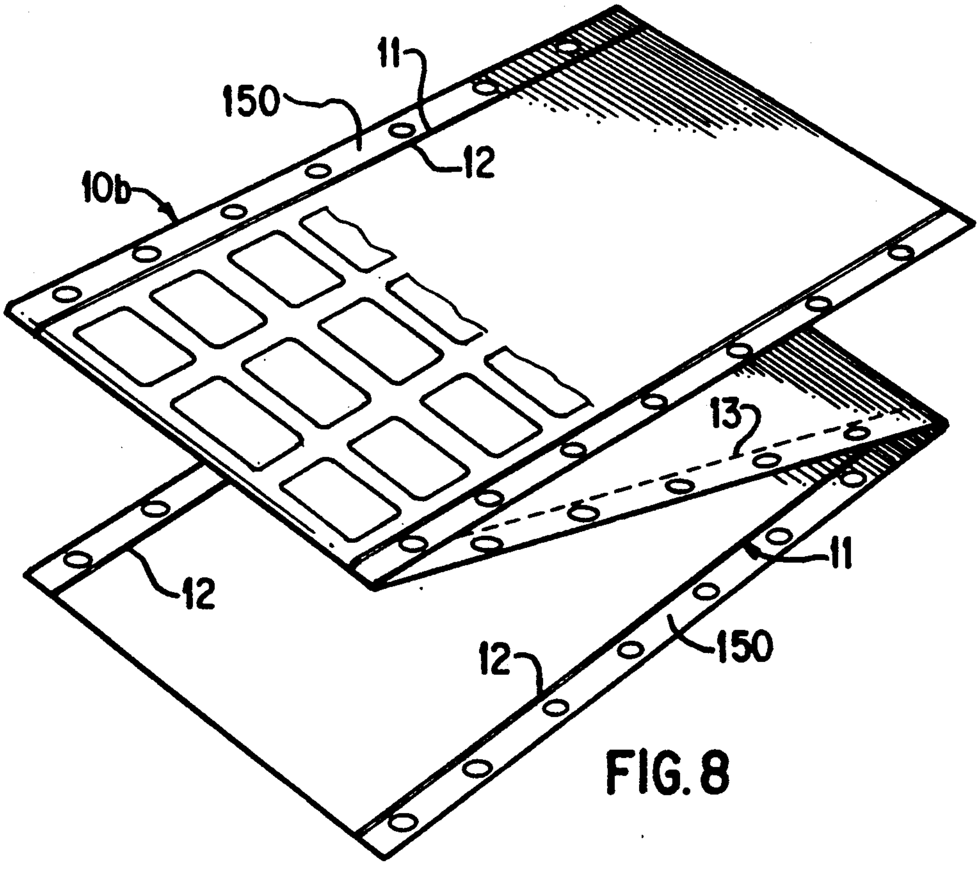
FIG. 8 is a perspective view of a continuous stock sheet having cards formed thereon, only partially illustrated, all in accordance with the principals of the invention but with the continuous stock sheet being fan folded for compact packaging.

Other variations of this invention are possible. FIG. 8 shows an extended card stock sheet 10*b* formed as a continuous strip which may be sized and fan folded to function in a computer and tractor strips 150 are positioned at each side of the sheet. A severance line 11 having a score cut 12 and perforations 13 is provided to separate the tractor strips 150 from the card stock sheet 10*b* when processing is completed.

Figure 9:
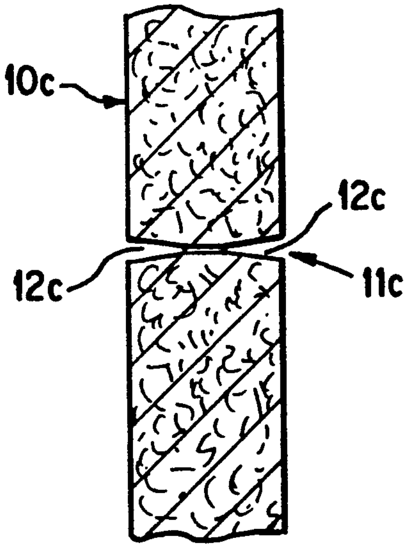
FIG. 9 is a transverse section, similar to FIG. 2 but depicting an alternative embodiment thereof using a score cut at both sides of the card stock, and with micro-perforations being between the two score cuts.

A further variation and alternate embodiments is illustrated at FIG. 9. The card stock sheet 10*c* is provided with a severance line 11*c* with a score cut 12*c* both sides of the sheet. Each score cut is aligned in spaced opposition with the other, but the depth of the score cuts is such that they do not meet leaving an uncut portion of the sheet. This central portion carries a line of micro-perforations 13*c*. The score cuts at each side render the edges of the severance line 11*c* extremely smooth.

I have now described my invention in considerable detail, however others skilled in the art can devise and develop alternate and equivalent constructions. Hence, I desire my protection to be limited not by the construction illustrated and described, but only by the proper scope of the appended claims.

I claim:

1. In a paper stock, a severance line comprising a score cut extending part way into the paper stock and a line of closely spaced perforations coinciding with the score cut line extending from the inner end of the score cut to the opposite side of the paper stock, whereby to permit the severance line to be severed by separation of stock portions at the perforations, and to provide smooth severed edges.

2. The combination defined in claim 1, wherein said paper stock comprises two laminated sheets with the score cut extending at least through one of said sheets.

3. The combination defined in claim 2, wherein said paper stock laminations are bonded together by an adhesive layer and said score cut extends through said layer.

4. The combination defined in claim 1, including score cuts from each side of the sheet extending part way into the sheet in mutual spaced opposition with the depth of each score cut being limited to provide a portion of uncut paper stock between the score cuts and wherein said perforations extend from the inner end of one score cut to the inner end of the other score cut.

5. The combination defined in claim 1, wherein the card or paper stock is single ply.

6. The combination defined in claim 1, wherein the paper stock is individual cut sheets.

7. The combination defined in claim 1, wherein the paper stock is accordion folded.

8. In a paper stock having a line of closely spaced perforations whereby the sheet portions at each side of the perforations may be separated along the perforation line, the improvement comprising a continuous score cut in one side of the sheet coinciding with the perforation line, extending part way into the sheet to connect with the perforations of the perforation line, whereby the uncut portions of the sheet between the perforations hold the sheet together but the sheet may be separated by severing said uncut portions.

9. A method for preparing a paper stock for subsequent separation along a perforation line in the sheet defined by a sequence of closely spaced perforations, including the step of imposing a continuous score cut at one surface of the sheet extending part way into the sheet and coinciding with the perforation line with uncut portions of the sheet between the perforations maintaining sheet integrity.

10. The method set forth in claim 9, wherein the paper stock sheet is a laminate formed of sheets adhered together and the score cut at the perforations extends through at least one sheet of the laminate.

* * * * *